Dec. 10, 1935.    F. HOLLINGSWORTH    2,024,040
PNEUMATIC TIRE AS USED FOR ROAD VEHICLES, AEROPLANES AND THE LIKE
Filed March 22, 1935    2 Sheets-Sheet 1

INVENTOR
Frank Hollingsworth
BY
Richard E. Babcock
ATTORNEY

Dec. 10, 1935.  F. HOLLINGSWORTH  2,024,040
PNEUMATIC TIRE AS USED FOR ROAD VEHICLES, AEROPLANES AND THE LIKE
Filed March 22, 1935  2 Sheets-Sheet 2
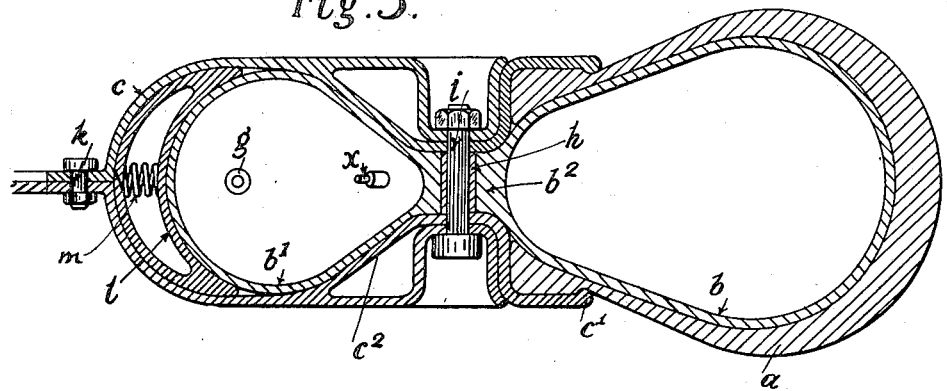
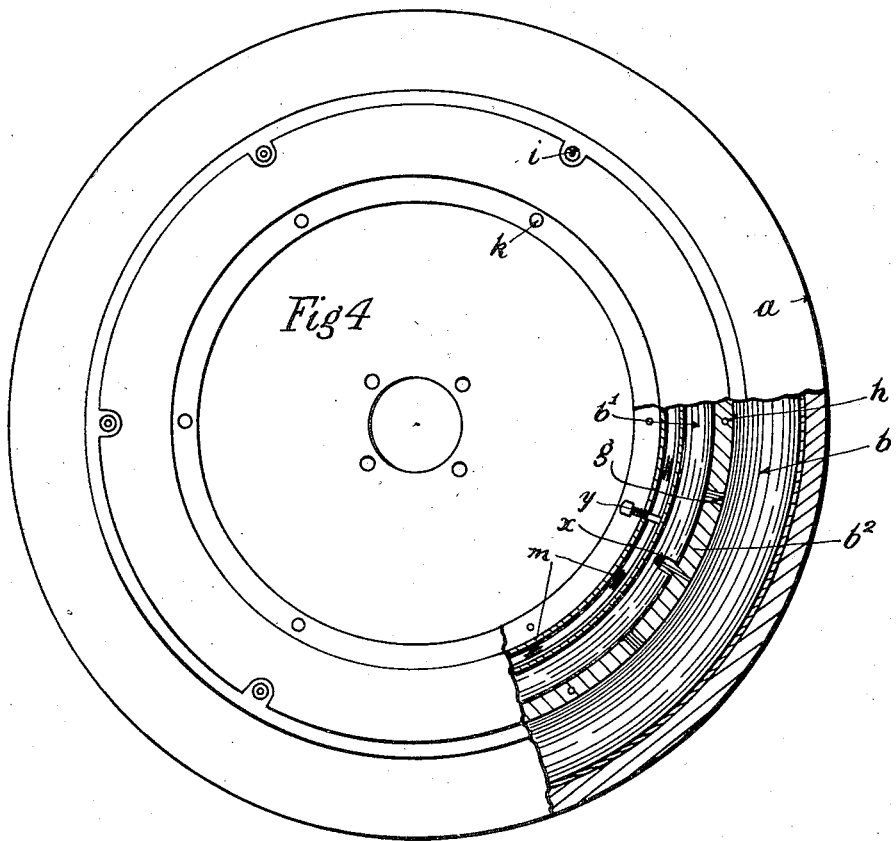
INVENTOR
Frank Hollingsworth
BY
Richard E. Babcock
ATTORNEY Patented Dec. 10, 1935

2,024,040

UNITED STATES PATENT OFFICE 2,024,040

PNEUMATIC TIRE AS USED FOR ROAD VEHICLES, AEROPLANES, AND THE LIKE

Frank Hollingsworth, Altrincham, England

Application March 22, 1935, Serial No. 12,507
In Great Britain March 28, 1934

3 Claims. (Cl. 152—29)

This invention relates to pneumatic tires as used for road vehicles, aeroplanes and the like and has for its object to provide improved and simplified means for the absorption of shock.

According to the present invention pneumatic tires for road vehicles, aeroplanes and the like comprise an inner tube provided with one or more outlets through non-return valves formed by rubber nipples normally tending to contract and close the orifices at the end but capable of opening with increased pressure in the tube, said nipples communicating with a storage tube or casing having a return conduit or conduits of a size and/or number graduated to retard the rebound to the required extent an expansion tube or casing preferably being used the cubical contents of which may be increased to receive air from the tire against spring or other pressure to return the air to the tire through the return conduit or conduits which retard the return flow and consequently the rebound.

The invention will be more particularly described by the aid of the accompanying drawings in which:—

Figure 3 is a cross-sectional view of one side of a modified form of pneumatic tire made according to the invention shown in position on a wheel whilst Figure 4 shows a front elevation of the wheel partly in section.

Figure 1:
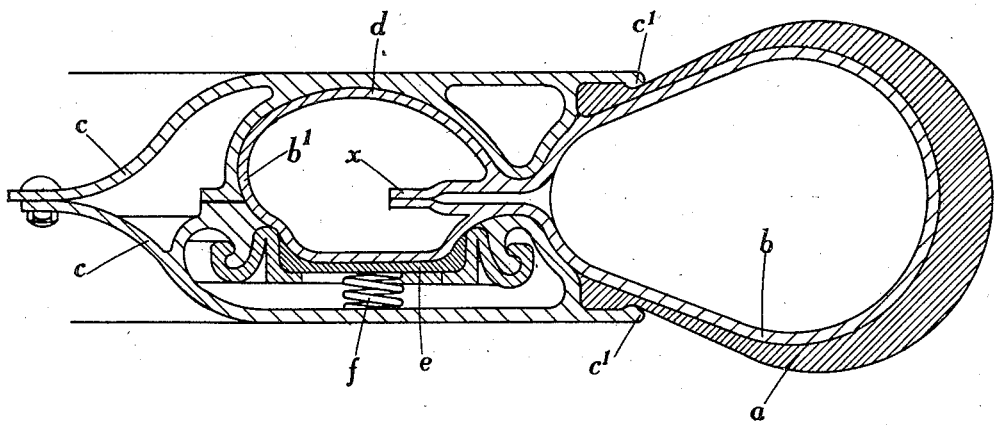
Figure 1 is a cross-sectional view of one side of a pneumatic tire shown in position on a wheel.
Figure 2:
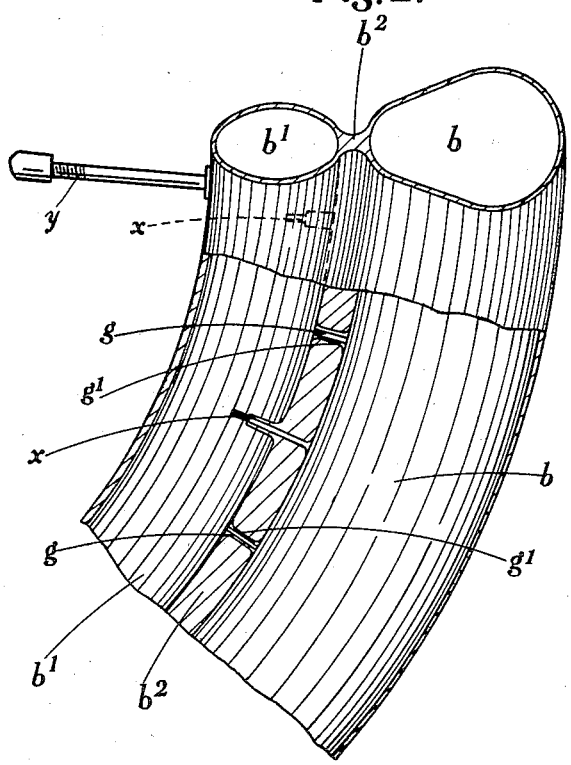
Figure 2 is a front elevation of a segment of the inner tube constructed according to the invention shown detached and partly in section.

In carrying the invention into effect according to one convenient manner as illustrated the pneumatic tire preferably comprises an outer cover $a$ with an inner tube $b$ although these may be combined in one if desired. The inner tube $b$ is provided with one or more non-return valve-controlling outlets $x$, the non-return valve being formed by a rubber nipple normally tending to contract and close the orifice at the end as shown but capable of opening with increased pressure in the inner tube, said nipples communicating with the expansion chamber or tube $b^1$ located in the rim of the wheel $c$ and supported for the major portion of its area by the wall of said rim which is provided with a suitably shaped recess $d$ to receive the same. The remainder of the exterior area of the expansion tube is supported by a rigid member, preferably in the form of a flat ring $e$ at one side which completes the chamber $d$ for said relief tube, said plate abutting against the springs $f$ which at the other end bear against the inner surface of the rim on that side, so that when the tire is compressed on meeting an obstruction and the pressure obtaining in the inner tube $b$ increased, the compressed air is forced through the non-return valves $x$ into the relief chamber so that the expansion tube $b^1$ expands and forces the compression plate $e$ outwards thereby compressing the springs $f$ but when said increased pressure is removed the springs $f$ reassert themselves to contract the relief chamber and force the air back to the inner tube $b$ through return conduits $g$ of a size and number graduated to retard the rebound to the required extent and thus tend to damp out the objectionable vibrations, said return conduits $g$ having metal liners $g^1$ therein, as shown, if desired. The two tubes $b$, $b^1$ are preferably connected together by a central rib $b^2$ through which the outlet and inlet conduits $x$ and $g$ respectively are formed. One or more return conduits $g$ are made through the rib $b^2$ of the required diameter and the tube $b^1$ is provided with an inlet valve $y$ through which the tire may be inflated in the usual manner. The wheel is divided in the central plane or one side may be removable to permit of assembling the parts whilst the outer periphery is provided with overhanging flanges $c^1$, $c^1$ to receive the beads on the outer cover $a$ of the tire or otherwise adapted to permit said outer cover being secured in position.

According to the embodiment illustrated in Figures 3 and 4 the inner tube $b$ is provided with one or more non-return valve controlled outlets $x$ formed by a rubber nipple normally tending to contract and close the orifice at the end said nipples communicating with the expansion tube $b^1$ connected to the inner tube $b$ by a central rib $b^2$ through which the outlet and inlet conduits $x$ and $g$ respectively are formed as in the last example. In this case said central rib $b^2$ is formed with transverse holes $h$ having metal liners $h^1$ through which pass bolts $i$ by means of which, together with the bolts $k$, the two halves of the rim of the wheel $c$ are bolted together. The wheel $c$ is formed with the overhanging edges $c^1$ to grip the beaded edge of the outer cover $a$ and is shaped on its interior face $c^2$ to form a support for the sides of the inner tube, a stiff fabric rubber casing $l$ fitting within the bottom of the wheel rim and carrying a series of radially disposed spiral springs $m$ to yieldingly support the outer face $l^1$ of the casing $l$ which is shaped to fit and form a spring yielding support for the expansion tube $b^1$ so that the latter is free to expand when the tire is compressed on meeting an obstruction but when said increased pressure is removed the springs $f$ reassert themselves to contract the relief chamber and force the air back to the inner tube $b$ through the return conduits $g$ as in the previous example.

By this invention very simple means are provided to damp out the vibrations in mass subjected to shocks.

Having now particularly described and ascertained the nature of my said invention and in what manner the same is to be performed, I declare that what I claim is:—

1. A pneumatic tire comprising an air tube and relief tube formed in one, non-return outlets leading from the air tube to the relief tube each formed by an integral rubber nipple normally tending to contract and close the orifice at the end leading to the relief tube and restricted return conduits between the two tubes adapted to retard the rebound of the tire, a valve for the admission of air to the tire and an outer cover for the compressible air tube, with a two part wheel rim upon which the tire is mounted, spring means within the rim to support the relief tube adapted to yield with increased pressure therein and return the air to the compressible air tube through the restricted return conduits.

2. A pneumatic tire comprising an air tube and relief tube formed in one with a central rib between the two, non-return outlets in said rib leading from the air tube to the relief tube each formed by an integral rubber nipple normally tending to contract and close the orifice at the end leading to the relief tube and restricted return conduits formed in said rib, a valve for the admission of air to the tire and an outer cover for the compressible air tube, with a two part wheel rim upon which the tire is mounted, together with spring means within the rim to expansibly support the relief tube.

3. A pneumatic tire comprising an air tube and relief tube formed in one with a central rib between the two, non-return outlets in said rib leading from the air tube to the relief tube each formed by an integral rubber nipple normally tending to contract and close the orifice at the end leading to the relief tube, restricted return conduits formed in said rib, a valve for the admission of air to the tire and an outer cover for the compressible air tube with a two part wheel rim upon which the tire is mounted, the detachable part of the rim being secured in position by bolts passing through holes in the central rib of the tire.

FRANK HOLLINGSWORTH.